3,597,484
PRODUCTION OF OLEFINICALLY UNSATURATED
OXO COMPOUNDS
Herbert Mueller, Frankenthal, Pfalz, and Harald Koehl and Horst Pommer, Ludwigshafen (Rhine), Germany, assignors to Badische Anilin- & Soda-Fabrik Aktiengesellschaft, Ludwigshafen (Rhine), Germany
No Drawing. Filed Feb. 28, 1968, Ser. No. 708,794
Claims priority, application Germany, Mar. 6, 1967,
P 12 75 050.4–42
Int. Cl. C07c 49/20
U.S. Cl. 260—593          9 Claims

ABSTRACT OF THE DISCLOSURE

The production of gamma-delta or delta-epsilon olefinically unsaturated oxo compounds (aldehydes or ketones) by heating 5,6-dihydro-4H-pyrans under a pressure of 10 to 300 atmospheres with a small amount of water at 280° to 350° C.

---

This invention relates to a new process for the production of olefinically unsaturated oxo compounds which contain the carbon-carbon double bond in the gamma-delta or delta-epsilon position to the oxo group.

The object of the invention is to make these compounds (hitherto obtainable only with difficulty) more readily accessible by a universally applicable method.

It is known from Houben-Weyl, "Methoden der organischen Chemie," volume 7/1, pages 249 et seq., that dihydro-4H-pyrans can be split at elevated temperature in a "retrograde diene synthesis" into acrolein and ethylene or corresponding derivatives thereof; olefinically unsaturated oxo compounds having the same number of carbon atoms as the starting pyran are not obtained. Similarly dihydro-4H-pyrans can be split in the presence of acids into derivatives of δ-oxyvaleraldehyde, but unsaturated carbonyl compounds devoid of hydroxy and alkoxy groups cannot be prepared in this way in one stage. In J. Amer. Chem. Soc., volume 78, page 992 and volume 80, pages 5266 to 5270, it is moreover stated that olefinically unsaturated oxo compounds undergo cyclization in the presence of acids diluted with water, for example α-methylheptenone to cis-1,3-dimethylcyclohexane-1,3-diol and trans-1,3-dimethylcyclohexane-1,3-diol; and β-methylheptenone to 1,3-dimethylcyclohexadiene-(1,3) and 1-methylene-3-methylcyclohexene-(2). It is known from the abovementioned journal, volume 78, page 2641, that 2,2-dimethyldihydropyran does not undergo ring cleavage even at 270° C. in benzene during two hours and under the same conditions in the presence of water mainly resinous residues separate out besides a small amount of carbocyclic compounds.

We have now found that olefinically unsaturated oxo compounds which contain the carbon-carbon double bond in gamm-delta or delta-epsilon position to the oxo group are obtained by heating a 5,6-dihydro-4H-pyran whose carbon atom in the 6-position bears at least one vicinal —CH, —CH$_2$ or —CH$_3$ group with a small amount of water at a pressure of from 10 to 300 atmospheres at a temperature of from 280° to 350° C.

The reaction in accordance with the invention may be represented as follows:

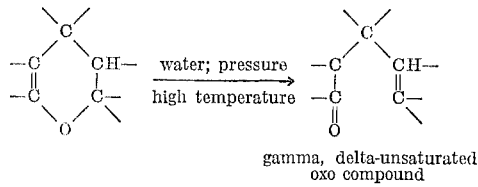

gamma, delta-unsaturated oxo compound

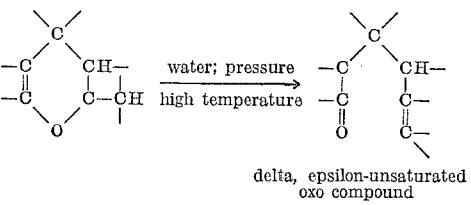

delta, epsilon-unsaturated oxo compound the free valencies being occupied by hydrogen atoms or hydrocarbon radicals. If the carbon atom in the 6-position of the pyran ring bears not only one but two or three —CH, —CH$_2$ or —CH$_3$ groups, a mixture of gamma, delta and delta, epsilon unsaturated oxo compounds is obtained. Aldehydes or ketones are obtained as the oxo compounds depending on whether the carbon atom in the 1-position is occupied by a hydrogen atom or a hydrocarbon radical.

Preferred substituents, besides hydrogen atoms, are hydrocarbon radicals having up to ten carbon atoms, particularly alkyl groups. Among the alkyl groups those having one to five carbon atoms are preferred, and among these particularly methyl. The preferred number of substituents is up to three.

The 5,6-dihydro-4H-pyrans used as starting materials may be obtained in a Diels-Alder reaction from an α,β-unsaturated aldehyde or ketone and an olefinically unsaturated hydrocarbon:

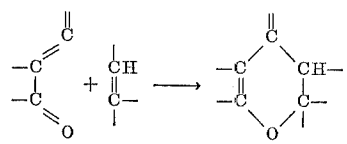

The small amount of water required for the reaction is as a rule 0.1 to 10% by weight, preferably 0.1 to 3% by weight with reference to 5,6-dihydro-4H-pyran. Substances which split off water, for example tertiary alcohols, may be used instead of water. The water presumably adds on intermediately to the starting compound so that the intermediate products, provided they are isolable, may also be further reacted.

The reaction is preferably carried out at a temperature of from 290° to 300° C. and at a pressure of from 25 to 100 atmospheres. The reaction pressure corresponds in general to the total vapor pressure of the components. Gases which are inert under the reaction conditions, e.g. nitrogen, may however also be used. Organic solvents which are inert under the reaction conditions, for example aromatic compounds such as benzene, may be added if desired.

The reaction may be carried out as follows: 5,6-dihydro-4H-pyran and a small amount of water, with or without a solvent, are introduced into a pressure reactor heated up to the reaction temperature. The reaction is carried out during from five minutes to four hours under the said conditions, the mixture is cooled and the end product is separated by a conventional method, for example by fractional distillation. The reaction may be carried out continuously or batchwise.

The unsaturated oxo compounds which can be prepared by the process of the invention are valuable intermediates for the production of perfumes.

The invention is illustrated by the following examples.

EXAMPLE 1

300 g. of 2,6,6-trimethyl-5,6-dihydro-4H-pyran and 5 g. of water are forced into a high pressure autoclave heated to 290° C. The mixture is kept at an autogenous pressure of 90 atmospheres for twenty-five minutes at 290° C. The mixture is then passed into a high pressure separator, cooled therein and then subjected to fractional distillation. Besides 16 g. of unreacted 2,6,6-trimethyl-5,6-dihydro-4H-pyran having a boiling point of 130° to 131° C. there is obtained 256 g. of a mixture of 6-methylhept-6-en-2-one and 6-methylhept-5-en-2-one having a boiling point of 170° C. at 760 mm. (equivalent to 90% of the theory with reference to reacted starting pyran).

EXAMPLE 2

150 g. of 2,6,6-trimethyl-5,6-dihydro-4H-pyran, 4 g. of water and 200 g. of benzene are forced into an autoclave which has been preheated to 300° C. The reaction mixture is left at 300° C. and 80 atmospheres for forty-five minutes, then separated through a high pressure separator and processed by fractional distillation. 11 g. of unreacted dihydropyran and 127 g. (equivalent to 92.7% of the theory with reference to reacted starting pyran) of a mixture of methylheptenones as in Example 1 are obtained.

EXAMPLE 3

100 g. of 6-methyl-6-neopentyl-5,6-dihydropyran, 4 g. of water and 300 g. of benzene are forced into a reactor preheated to 300° C. The mixture is then left at this temperature and at 100 atmospheres for one hour. The mixture is separated and worked up in the manner described in Example 2. 16 g. of unreacted 6-methyl-6-neopentyl-5,6-dihydro-4H-pyran having a boiling point of 106° to 109° C. at 50 mm. and 70 g. (87.5% of the theory with reference to reacted starting pyran) of a mixture of 5-methyl-7-dimethyloct-4-en-1-al and its isomers (the corresponding 5-ene compound and of 5-methyleneoctane) having a boiling point of 52° to 54° C. at 2 mm. are obtained.

We claim:

1. A process for the production of olefinically unsaturated oxo compounds containing the carbon-carbon double bond in gamma-delta or delta-epsilon position to the oxo group, which process comprises heating 5,6-dihydro-4H-pyran substituted by one to three alkyl groups wherein said alkyls have one to five carbon atoms, at least one of said alkyl substituents being attached in the 6-position, with 0.1 to 10% by weight of water, with reference to the amount of the dihydropyran, at a pressure of 10 to 300 atmospheres and at a temperature of 280° to 350° C.

2. A process as claimed in claim 1 wherein the amount of water is 0.1 to 3% by weight of the amount of dihydropyran.

3. A process as claimed in claim 1 wherein the reaction is carried out at a temperature of from 290° to 300° C.

4. A process as claimed in claim 1 carried out at a pressure of from 25 to 100 atmospheres.

5. A process as claimed in claim 1 wherein the 5,6-dihydro-4H-pyran used bears one alkyl group having one to five carbon atoms as a substituent.

6. A process as claimed in claim 1 wherein the 5,6-dihydro-4H-pyran bears two alkyl groups having one to five carbon atoms as substituents.

7. A process as claimed in claim 1 wherein the 5,6-dihydro-4H-pyran used bears three alkyl groups having one to five carbon atoms as substituents.

8. A process as claimed in claim 1 wherein the initial dihydropyran reactant is 2,6,6-trimethyl-5,6-dihydro-4H-pyran.

9. A process as claimed in claim 1 wherein the initial dihydropyran reactant is 6-methyl-6-neopentyl-5,6-dihydro-4H-pyran.

References Cited

UNITED STATES PATENTS

| | | |
|---|---|---|
| 2,515,304 | 7/1950 | Jones. |
| 2,624,764 | 1/1953 | Emerson et al. _____ 260—593 |

FOREIGN PATENTS

| | | |
|---|---|---|
| 521,929 | 2/1956 | Canada _____ 260—593 |

OTHER REFERENCES

Meinwald et al. J. Amer. Chem. Soc., vol. 80, 5266–5270.

W. B. LONE, Assistant Examiner

BERNARD HELFIN, Primary Examiner

U.S. Cl. X.R.

260—601